United States Patent
Bessler et al.

(10) Patent No.: US 10,445,403 B2
(45) Date of Patent: Oct. 15, 2019

(54) METHOD AND SYSTEM FOR TRACKING THE CENTRE OF A PEAK FROM A PLURALITY OF SAMPLE POINTS IN AN OPTICAL SYSTEM

(71) Applicant: FAZ Technology Limited, Dublin (IE)

(72) Inventors: Vivian Bessler, Dublin (IE); John O'Dowd, Dublin (IE)

(73) Assignee: FAZ TECHNOLOGY LIMITED (IE)

( * ) Notice: Subject to any disclaimer, the term of this patent is extended or adjusted under 35 U.S.C. 154(b) by 275 days.

(21) Appl. No.: 15/029,716

(22) PCT Filed: Oct. 16, 2014

(86) PCT No.: PCT/EP2014/072271
§ 371 (c)(1),
(2) Date: Apr. 15, 2016

(87) PCT Pub. No.: WO2015/055791
PCT Pub. Date: Apr. 23, 2015

(65) Prior Publication Data
US 2016/0239464 A1 Aug. 18, 2016

Related U.S. Application Data

(60) Provisional application No. 61/891,611, filed on Oct. 16, 2013.

(30) Foreign Application Priority Data

Oct. 16, 2013 (EP) .................................... 13189006

(51) Int. Cl.
*G01D 5/353* (2006.01)
*G06F 17/17* (2006.01)

(52) U.S. Cl.
CPC .......... *G06F 17/17* (2013.01); *G01D 5/35312* (2013.01); *G01D 5/35316* (2013.01); *G01D 5/35319* (2013.01)

(58) Field of Classification Search
CPC .......................... G06F 17/17; G01D 5/35319; G01D 5/35312; G01D 5/35316
See application file for complete search history.

(56) References Cited

U.S. PATENT DOCUMENTS

| | | | | | |
|---|---|---|---|---|---|
| 3,836,735 | A | * | 9/1974 | Bradley | ................... H04B 3/46 379/24 |
| 7,885,480 | B2 | * | 2/2011 | Bryll | ........................ G06T 7/32 382/141 |

(Continued)

OTHER PUBLICATIONS

Rivera, E., et al., "Accurate strain measurements with fiber Bragg sensors and wavelength references", Smart Materials and Structures, IOP Publishing Ltd., Bristol, GB, vol. 15, No. 2, Apr. 2006 (Apr. 2006), pp. 325-330, XP020105355, ISSN: 0964-1726, DOI: 10.1088/0964-1726/15/2/012 (p. 325-p. 327).

(Continued)

*Primary Examiner* — Khamdan N. Alrobaie
(74) *Attorney, Agent, or Firm* — Polsinelli PC

(57) ABSTRACT

A system and method of determining the center of a peak of data points of an optical sensor are disclosed. The method can comprise the steps of performing an initial setup measurement of the sample points and extracting a peak; fitting the peak with a function that uses at least one of the peak's width, amplitude and center offset as fitting parameters; producing a set of linear equations which when solved calculate the optimum fit of a function to the peak assuming the previously calculated peak's width; and performing subsequent measurements of the data points to find peaks and solving the set of linear equations to determine the center of the peaks.

27 Claims, 6 Drawing Sheets

(56) References Cited

U.S. PATENT DOCUMENTS

2013/0116934 A1\* 5/2013 Yamada .............. H01J 49/0036
702/28
2015/0349485 A1\* 12/2015 Selwan ................ H01S 5/1092
372/20

OTHER PUBLICATIONS

Kollar, I. and Blair, J., "Improved Determination of the Best Fitting Sine Wave in ADC Testing", IEEE Transactions on Instrumentation and Measurement, IEEE Service Center, Piscataway, NJ, US, vol. 54, No. 5, Oct. 2005 (Oct. 2005), pp. 1978-1983, XP011140107, ISSN: 0018-9456, DOI: 10.1109/TIM.2004.838913.
Coe, Paul Andrew, "An Investigation of Frequency Scanning Interferometry for the alignment of the ATLAS semiconductor tracker", PhD Thesis, Oxford University, 2001, XP055134338, Retrieved from the Internet: URL:http://cds.cern.ch/record/1074719/files/thesis-2007-082.pdf, [retrieved on Aug. 12, 2014], pp. 1-238 (p. 208).
Paterno, A. S., et al., "Approximation Methods of Optical Spectra: An Analysis of the Application of Constructive RBF Networks in Fiber Optic Sensing", Learning and Nonlinear Models—Revista Da Sociedade Brasileira De Redes Neurais, vol. 3, No. 2, 2005, pp. 61-70, XP055163900.
Ramos, Pedro M., et al., "Improving Sine-Fitting Algorithms for Amplitude and Phase Measurements", XVII Imeko World Congress Metrology in the 3rd Millennium, Jun. 22, 2003 (Jun. 22, 2003), pp. 614-619, XP055134290.
International Search Report and Written Opinion Form PCT/ISA/220, International Application No. PCT/EP2014/072271, pp. 1-12, International filing date Oct. 16, 2014, dated Jan. 28, 2015.

\* cited by examiner

METHOD AND SYSTEM FOR TRACKING THE CENTRE OF A PEAK FROM A PLURALITY OF SAMPLE POINTS IN AN OPTICAL SYSTEM

FIELD OF THE APPLICATION

The present application relates to a method and system to measure the centre of a peak from a plurality of sample points accurately in a computationally efficient manner in an optical system.

BACKGROUND

Optical sensor interrogation techniques now form a mature field of research where computational techniques are often used to improve the process of monitoring optical sensors. Optical sensors are usually subject to uniform fields of certain types of perturbation such as temperature or strain. In one use, the spectrum of the light reflected by a sensor has its peak monitored, indicating the magnitude of the perturbation. Finding the peak of sample points is a well used method to reduce the noise on the returned peak centre value. For example, FIG. 1 shows a sequence of 'sampling points' captured by a measuring device, such as a sensor. It is desirable to measure the 'centre' of a 'peak' in 'sample points' accurately in a computationally efficient manner.

Fitting sampling points in order to accurately ascertain a centre wavelength/frequency has been shown to provide a high level of accuracy. Depending on the fitting approach taken (Gaussian, Polynomial etc.) it can be challenging to perform a large number of computationally demanding accurate fits in a timely and efficient manner.

A Gaussian fit has been shown to provide accurate centres but the Gaussian function is non-linear with respect to its fitting parameters and therefore requires an iterative algorithm such as the Levenberg-Marquardt algorithm to perform the minimization of its sum of squares required for a least squares fit. These non-linear minimization algorithms are computationally intensive, require significant resources when implemented in hardware and their iterative nature leads to non-deterministic runtimes making them less suitable to real-time systems. A polynomial is a linear function with respect to its fitting parameters and therefore a polynomial fit can be solved in constant time by solving a set of linear equations. The higher the polynomial order the better the fit, however the higher order also introduces more degrees of freedom and this leads to a high level of instability and greater noise in the calculated centre wavelength/frequency values.

A paper publication by Rivera E et al and entitled 'Accurate strain measurements with Fiber Bragg sensors and wavelength references', Smart Materials and Structures, IOP publishing Ltd, Bristol GB, col. 15, no. 2, April 2006 discloses an accurate strain measurement using fiber Bragg sensors and wavelength measurements. Rivera et al. discloses a polynomial fit which provides moderate accuracy, when compared to Lorentzian and Gaussian described above. A second order polynomial, at minimum, is required to fit an FBG and using this does not constrain the peak to be symmetrical, but FBG profiles are largely symmetrical. Gaussian and Lorentzian profiles are symmetrical and using these in FBG fits imposes an assumption of symmetry, essentially providing a matched filter which is more resilient to noise than the polynomial approach. Rivera et al discloses that the polynomial fit is more computationally efficient than the lower noise approaches investigated, namely Gaussian and Lorentzian, however noise becomes a problem for high sensitivity operation. Systems which have a high sensor count combined with a requirement for high sensitivity and high frequency operation require a combination of high computational efficiency and effective noise tolerance. Thus Rivera does not offer a solution for high-frequency, high-sensor-count, high-sensitivity optical sensing.

It is therefore an object to provide an improved system and method to measure a centre wavelength/frequency accurately in an optical system at high frequency and high sensitivity.

SUMMARY

Systems and methods for determining the centre of a peak of data points for an optical sensor are disclosed herein, and as set out in the appended claims. As an example, a method to determine the centre of a peak of data points from an optical sensor can include:
  performing an initial setup measurement of the sample points of the optical sensor and extracting a peak;
  fitting the peak with a function that uses at least one of the peak's width, amplitude, centre offset, or a combination thereof as fitting parameters;
    producing a set of linear equations which when solved calculate the optimum fit of a function to the peak assuming the previously calculated peak's width; and
    performing subsequent measurements of the data points to find peaks and solving the set of linear equations to determine the centre of the measured peaks.

By using the fact that the width of a sensors spectral peak is largely constant the computation required is reduced for a sinusoidal fit to solving a set of linear equations which can be efficiently implemented in software or hardware. The sinusoidal fit provides a stable solution for accurately locating an optical sensor peak. Non-linear fitting approaches such a Gaussian fit can be very reliant on good initial fitting parameters and also result in unstable results. In other words the invention first characterises the width of the FBG and then utilizes this fixed width in subsequent fits. Using this fixed width in the subsequent fits allows for computational efficiency by reducing the time/resources required to process a peak, and enhances the matched filter characteristics of the symmetrical sinusoidal fit.

In one embodiment the sinusoidal approach of the invention utilizes the consistent width of an FBG to provide a result with noise tolerance comparable to Gaussian or Lorentzian while maintaining the computational efficiency of a polynomial fit. This allows for the use of this sinusoidal fitting approach in systems which have a high sensor count combined with a requirement for high sensitivity and high frequency operation.

Similar to a non-linear fitting approach this system also supports a weighted fit which can overcome fitting inaccuracies due to poorly fitting FBG tail samples pulling a fit incorrectly. In addition to the approach providing an efficient implementation it also results in a simple implementation which is therefore very suitable to a hardware implementation for an optical interrogator system interrogating a large number of optical sensors.

In one embodiment the measurement comprises the step of interrogating a sensor.

In one embodiment the measurement comprises the step of interrogating an optical sensor.

In one embodiment the measurement comprises the step of interrogating a FBG, etalon, Gas Cell, Fabry Perot Interferometer or Mach Zehnder Interferometer.

In one embodiment the centre of the measured peak moves within the measurement window but the width of the peak remains constant.

In one embodiment the fitting function is linear with respect to three fitting parameters such that its sum of squares minimization can be performed by solving a set of linear simultaneous equations.

In one embodiment the fitting function comprises a sinusoidal function or Fourier Fit.

In one embodiment the fitting function is configured to support weighting each fit point.

In one embodiment the fit points can be processed in hardware.

In another embodiment there is provided a system for determining the centre of a peak of data points of an optical sensor is disclosed. The system may include a memory that stores instructions and a processor that executes the instructions to perform various operations of the system. The processor can be a processor of an interrogator or other device in communication with an interrogator. The operations can include:
  performing an initial setup measurement of the sample points and extracting a peak;
  fitting the peak with a function that uses at least one of the peak's width, amplitude, centre offset, or a combination thereof as fitting parameters;
  producing a set of linear equations which when solved calculate the optimum fit of a function to the peak assuming the previously calculated peak's width; and
  performing subsequent measurements of the data points to find peaks and solving the set of linear equations to determine the centre of the peaks.

In one embodiment the fitting function comprises a sinusoidal function.

In another embodiment there is provided a system for determining the centre of a peak of data points of an optical sensor. The system may include a memory that stores instructions and a processor that executes the instructions to perform various operations of the system. The processor can be a processor of an interrogator or other device in communication with an interrogator. The operations can include
  performing an initial setup measurement of the data points to find a peak; fitting the peak with a fitting function that uses the peak's width, amplitude, centre offset, or a combination thereof as fitting parameters;
  producing a set of linear equations which when solved calculate the optimum fit of a function to the peak assuming the previously calculated peak's width.
  performing runtime high-frequency measurements of the data points to find peaks and solving the set of linear equations to efficiently determine the accurate centre of the peaks.

In a further embodiment there is provided a computer-readable device having instructions for determining the centre of a peak of data points of an optical sensor is provided. The computer instructions, which when loaded and executed by a processor, may cause the processor to perform operations including:
  performing an initial setup measurement of the sample points and extracting a peak;
  fitting the peak with a fitting function that uses at least one of the peak's width, amplitude, centre offset, or a combination thereof as fitting parameters;
  producing a set of linear equations which when solved calculate the is optimum fit of a function to the peak assuming the previously calculated peak's width; and
  performing subsequent measurements of the data points to find peaks and solving the set of linear equations to determine the centre of the peaks.

In another embodiment there is provided a method for determining the centre of a Fibre Bragg Grating (FBG) device comprising:
  interrogating the FBG device to find a wavelength peak;
  calculating a constant spectral width for the FBG device;
  applying a fitting function to the constant spectral width and representing as a set of linear equations; and
  solving the set of linear equations to determine the centre of the FBG device.

The method may include utilizing a memory that stores instructions, and a processor that executes the instructions to perform the various functions of the method.

The method may include utilizing a memory that stores instructions, and a processor that executes the instructions to perform the various functions of the method.

In another embodiment there is provided a system for determining the centre of a Fibre Bragg Grating (FBG) device is disclosed. The system may include a memory that stores instructions and a processor that executes the instructions to perform various operations of the system. The operations can include:
  interrogating the FBG device to find a wavelength peak;
  calculating a constant spectral width for the FBG device;
  applying a fitting function to the constant spectral width and representing as a set of linear equations; and
  solving the set of linear equations to determine the centre of the FBG device.

There is also provided a computer program comprising program instructions for causing a computer program to carry out the above method which may be embodied on a record medium, carrier signal or read-only memory.

BRIEF DESCRIPTION OF THE DRAWINGS

The methods and systems will be more clearly understood from the following description of an embodiment thereof, given by way of example only, with reference to the accompanying drawings, in which.

DETAILED DESCRIPTION OF THE DRAWINGS

The invention provides a system and method that can be used in an optical interrogator system configured to communicate with a plurality of optical sensors, for example a FBG sensor. In the context of the present invention FBG sensors are described, but it will be appreciated that the invention can be applied to other optical sensors.

Figure 1:
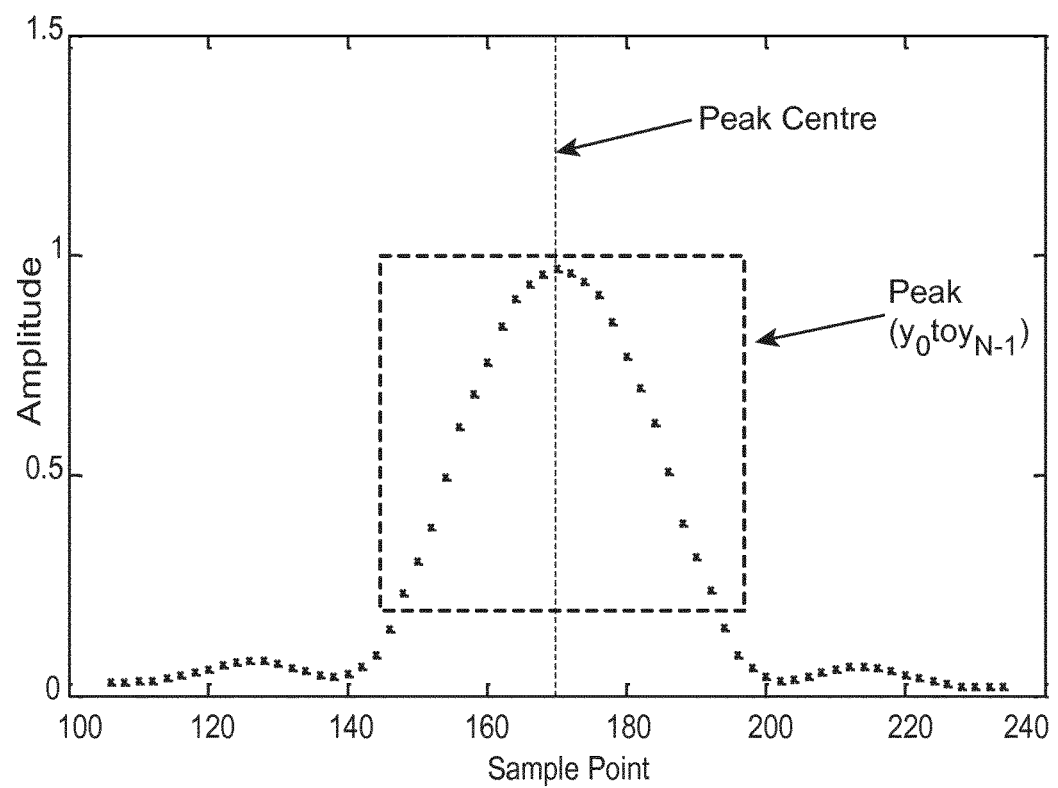
FIG. 1 illustrates a peak among sample points and the centre.
Figure 2:
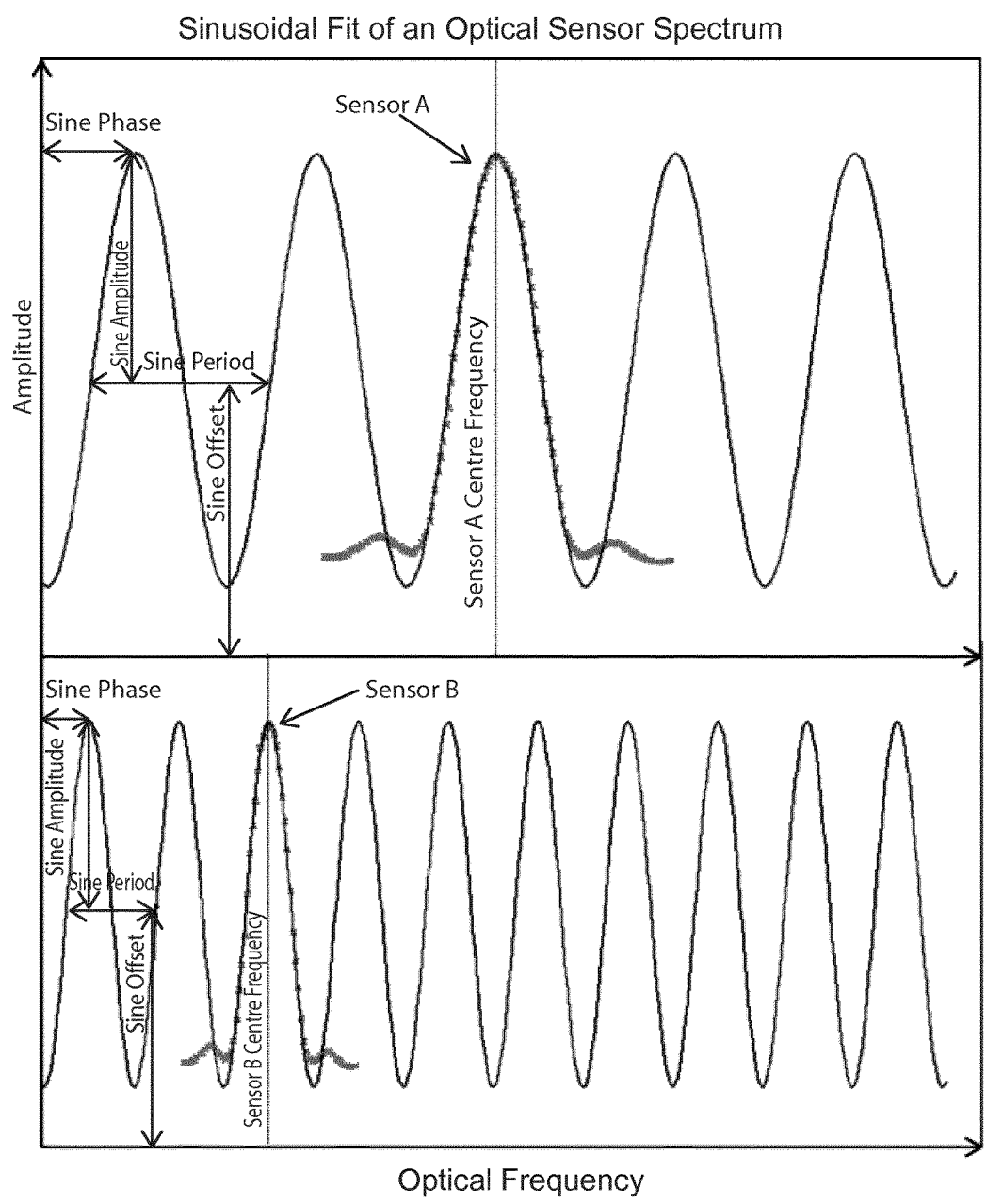
FIG. 2 illustrates a the sinusoidal fit of two FBG sensors A and B.

FIG. 2 illustrates a sinusoidal fit of two FBGs, sensor A and a narrower sensor, B. The FBG spectral sample points produced by an optical interrogator are shown as crosses and the fit sine waves are shown as solid lines. The resolution of the interrogator used determines the number of spectral sample points that are produce for each FBG profile. A wider FBG (higher full-width-half-max) has more sample points in its peak. When fitting the FBG spectral sample points with a sine function more fit points are used for wider FBG peaks. A sine function is suitable for fitting FBG peaks providing good stability and accurate centres, which is an important aspect to the invention.

The sine function in FIG. 2 can be produced from the following equation:

$$f(x)=A*\text{Sin}(w*x+p)+C$$

A is the amplitude
w is the frequency (1/period)
p is the phase
C is the y offset The centre of the peak can be determined by the value p. However this function is not linear with respect to its fitting parameters (A, w, p and C) and has the same shortcomings of the Gaussian fit requiring a non-linear fitting technique.

The following function is equivalent to the sine function above:

$$f(x)=A*\sin(w*x)+B*\cos(w*x)+C$$

x is the index of the y value within the profile to be fit.
C is an offset.
A and B are scalars.

This function is linear with respect to all fitting parameters except w. FBGs typically have a constant spectral width. By assuming a constant width it is possible to reduce the fitting parameters to A, B and C. The fitting function is now linear with respect to these three fitting parameters and its sum of squares minimization can be performed by solving a set of linear simultaneous equations.

Using this formula it is possible to fit a sine wave to data where the width of the pulse is determined by w, it's y offset by c and its x offset and amplitude by A and B (combined not respectively).

An equation for the sum of the squares of residuals can be generated from the above formula:

$$\text{SOS}=\Sigma(h_n*(y_n-(A*\sin(w*n)+B*\cos(w*n)+C))^2)$$

where:
SOS is the sum of the squares of the residuals.
$\Sigma$ is over n=0 to N−1
$h_n$ is a point weighting factor associated with each fit point.

For any given FBG spectrum peak it is desirable to find values for A, B and C which result in SOS being minimum. Three simultaneous linear equations can be generated by differentiating SOS with respect to A, B and C and setting the derivative equal to 0. Solving these simultaneous equations gives the optimum values of A, B and C for a given FBG spectrum peak. From the values of A and B the centre of the sine wave can be determined.

It will be appreciated that from the general solution for the three simultaneous equations it is found that only three terms are dependent upon the FBG spectral sample values. These are:

$$S1=\Sigma h_n*y_n*\sin(w*n)$$

$$S2=\Sigma h_n*y_n*\cos(w*n)$$

$$S3=\Sigma h_n*y_n$$

n is the index of the y value within the profile to be fit. The sum total is for n=0 to N−1, where N is the number of fit points.

It is possible to find the fit centre with the following formula:

$$A=\text{const1}*S1+\text{const2}*S3+\text{const3}*S2$$

$$B=\text{const4}*S1+\text{const5}*S3+\text{const6}*S2$$

$$\text{centre}=a\,\cos(B/(B^2+A^2)^{0.5})/w$$

Where const1 to const6 are pre-calculated constants. These formulas can be used to calculate the wavelength/frequency offset of the FBG centre relative to the wavelength/frequency of the first fit point of the peak. To calculate the absolute wavelength/frequency of the FBG, the centre must be added on to the wavelength/frequency of the first fit point.

Figure 3:
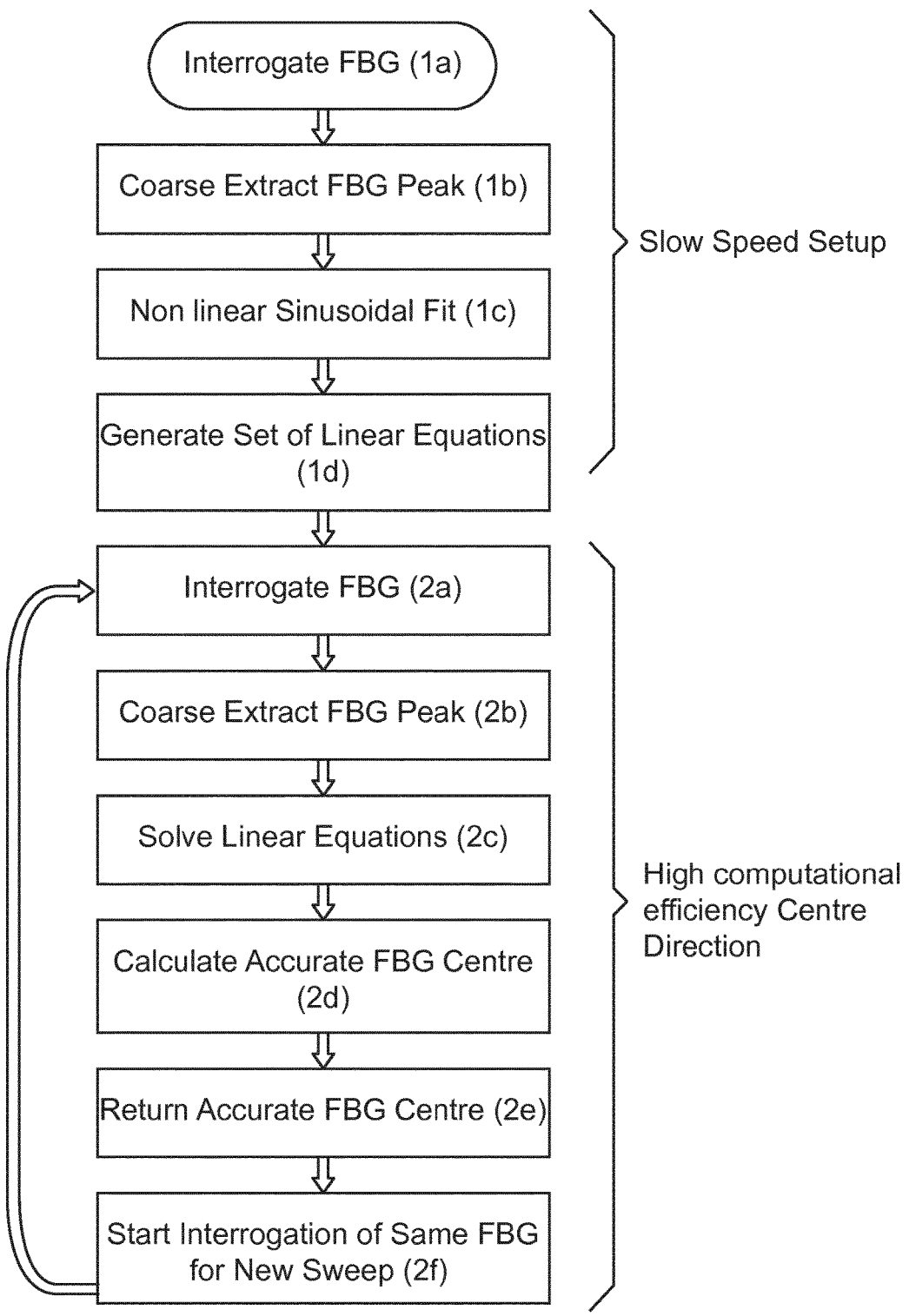
FIG. 3 illustrates a flowchart showing how the centre of a Fibre Bragg Grating (FBG) device is determined, according to one embodiment.

The operation of the methods and systems is detailed in FIG. 3.
1. Prior to high-frequency interrogation it is required to find the frequency of a suitable sine wave to fit to the FBG peak. This calculated frequency can then be used in subsequent high-speed fits in order to reduce the computational complexity of the fit.
   a. Interrogate the FBG to produce a spectrum of sample points.
   b. Extract the FBG Peak from the Measured Spectrum sample points, Choosing a number of sample points around the approximate peak centre ($y_0$ to $y_{N-1}$). Larger numbers of fit points are advantageous as it minimizes the noise on the fit peak centre, however choosing too many point results in instability as the method attempts to fit the tails of the FBG which poorly match the sine function. It is therefore desirable to pick the largest number of fit points where the FBG's shape still remains largely sinusoidal.
   c. Perform a Nonlinear Sinusoidal Fit of the FBG Peak. The phase, amplitude and frequency are free fitting parameters.
   d. Using the best fit frequency parameter returned by the nonlinear fit a linear sinusoidal fit is now possible. Generate a set of linear equations to solve the least squares sinusoidal fit. All values that are data point independent can be pre-calculated and stored.
2. With all per-fit independent values pre-calculated, the FBG can be interrogated and the FBGs moving centre can be computed at a high-frequency while significantly reducing the necessary computation. The high speed centre detection can include:
   a. Interrogating the FBG to measure a spectrum of sample points.
   b. Extracting the FBG peak as before.
   c. Calculating the data dependant component to complete the solution to the linear equations resulting in the optimum fitting parameters.
   d. Calculating the FBG centre from the optimum fit. This centre FBG frequency/wavelength will be relative to the frequency/wavelength of the first data point used in the fit. To calculate the absolute frequency/wavelength we must add on the wavelength/frequency value of the first data point.

e. Return the centre wavelength as the measurement result for this interrogation sweep.

f. Start interrogating and calculating FBG centres for the next sweep.

Figure 4:
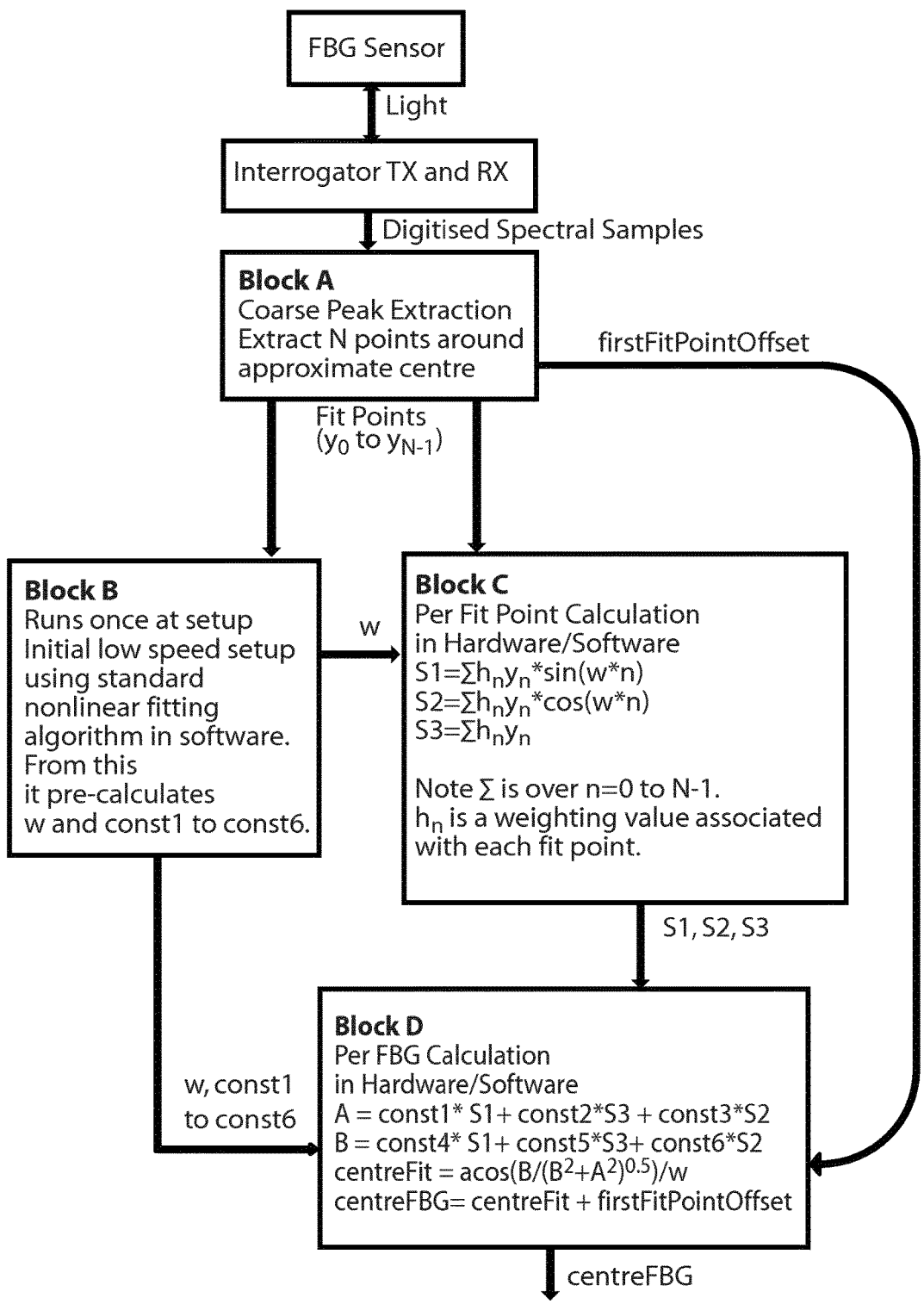
FIG. 4 illustrates a general block diagram of an implementation, according to one aspect of the embodiment.

In one embodiment the implementation comprises of an interrogator producing a digitized sequence of spectral sweeps. Each sweep is a sequence of samples points that contains spectral peaks of one or more FBGs. In addition the implementation incorporates blocks A, B, C and D as shown in FIG. 4. Block A extracts a fixed number of sample points from the entire spectral sweep with the approximate peak centre at in the middle of the extracted samples. Block A can use thresholding to identify peaks and then use the maximum sample above the threshold to identify the approximate centre wavelength. Block A passes on the extracted peak and the wavelength/frequency of the first extracted sample (firstFitPointOffset). Block A performs this task for every sweep and to support high frequency sweeps it can be implemented in hardware. Block B is only run at setup. Its purpose is to calculate w, the frequency of the sine function to be used in subsequent highly computationally efficient fits. It also pre-calculates constants 1 to 6 which are the sample point is independent calculations required for solving the subsequent highly computationally efficient fits. These values remain constant for subsequent high-frequency fits. Block C calculates running totals based on the fit points passed to it from Block A. When all samples in the fit have passed to block C its running totals will have calculated S1 to S3. With S1 to S3 calculated Block D can calculate the accurate centre FBG wavelength/frequency.

Figure 5:
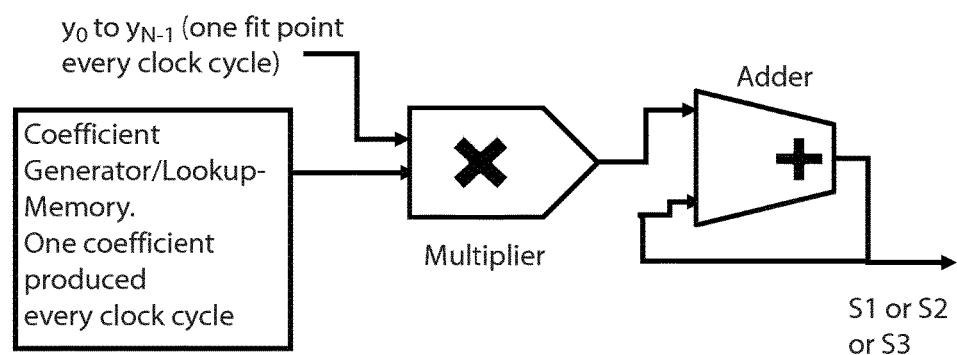
FIG. 5 illustrates a block diagram of a hardware implementation for one of the processing elements, according to one embodiment.

FIG. 5 shows an example hardware implementation suitable to calculate any one of S1, S2 or S3 calculations. Block C consists of three copies of the structure shown in FIG. 5. For this structure each hardware clock cycle the pipelined multiplier takes in a fit sample and a coefficient (higher throughputs can be achieved through parallelism). A number of clock cycles later the product of these two values is output. The multiplier will take in one set of values every clock cycle and produce an output every clock cycle. There is a pipeline delay of several clock cycles for the output produced for any given input. The product is passed to an adder which accumulates a sum over the products for a given set of fit samples. This adder has a single clock cycle delay between its inputs and outputs. For typical scenarios the number of points to be fit is <1000 and this facilitates storing pre-calculated values of $h_n*\sin(w*n)$ and $h_n*\cos(w*n)$ in a coefficient lookup-memory where $n=0 \ldots N-1$ (where N is the number of points to be fit). Alternatively hardware can be used to generate the coefficients mathematically. The sin (w*n) and cos (w*n) sequence of coefficients can be conveniently generated in hardware using the Chebyshev method eliminating the need to use computationally intensive CORDIC or memory consuming lookup table approaches.

Block D can be calculated once for every fit. The small amount of per fit data required for this calculation (S1,S2,S3 and firstFitPointOffset) and the relative low frequency of calculation means it can be implemented in software or hardware. The identity:

$$a\tan 2(A/B) = a\cos(B/(A^2+B^2)^{0.5})$$

can be used to reduce the hardware/software resources/time required for the block Ds computation. The a tan2 function can be implemented in hardware using lookup-tables and interpolation or through CORDIC. Block D only needs to perform its calculation once per FBG fit and in a hardware implementation it can be shared between multiple FBG channels in order to maximize the utilization of the required hardware resources. It will be appreciated that other hardware implementations can be used.

It will be further appreciated that while an optical embodiment is described, the methods and systems can be applied to non-optical applications.

The embodiments described with reference to the drawings comprise a computer apparatus and/or processes performed in a computer apparatus. However, the methods and systems also extend to computer programs, particularly computer programs stored on or in a carrier adapted to bring the methods and systems into practice. The program may be in the form of source code, object code, or a code intermediate source and object code, such as in partially compiled form or in any other form suitable for use in the implementation of the method. The carrier may comprise a storage medium such as ROM, e.g. CD ROM, or magnetic recording medium, e.g. a floppy disk or hard disk. The carrier may be an electrical or optical signal which may be transmitted via an electrical or an optical cable or by radio or other means.

Figure 6:
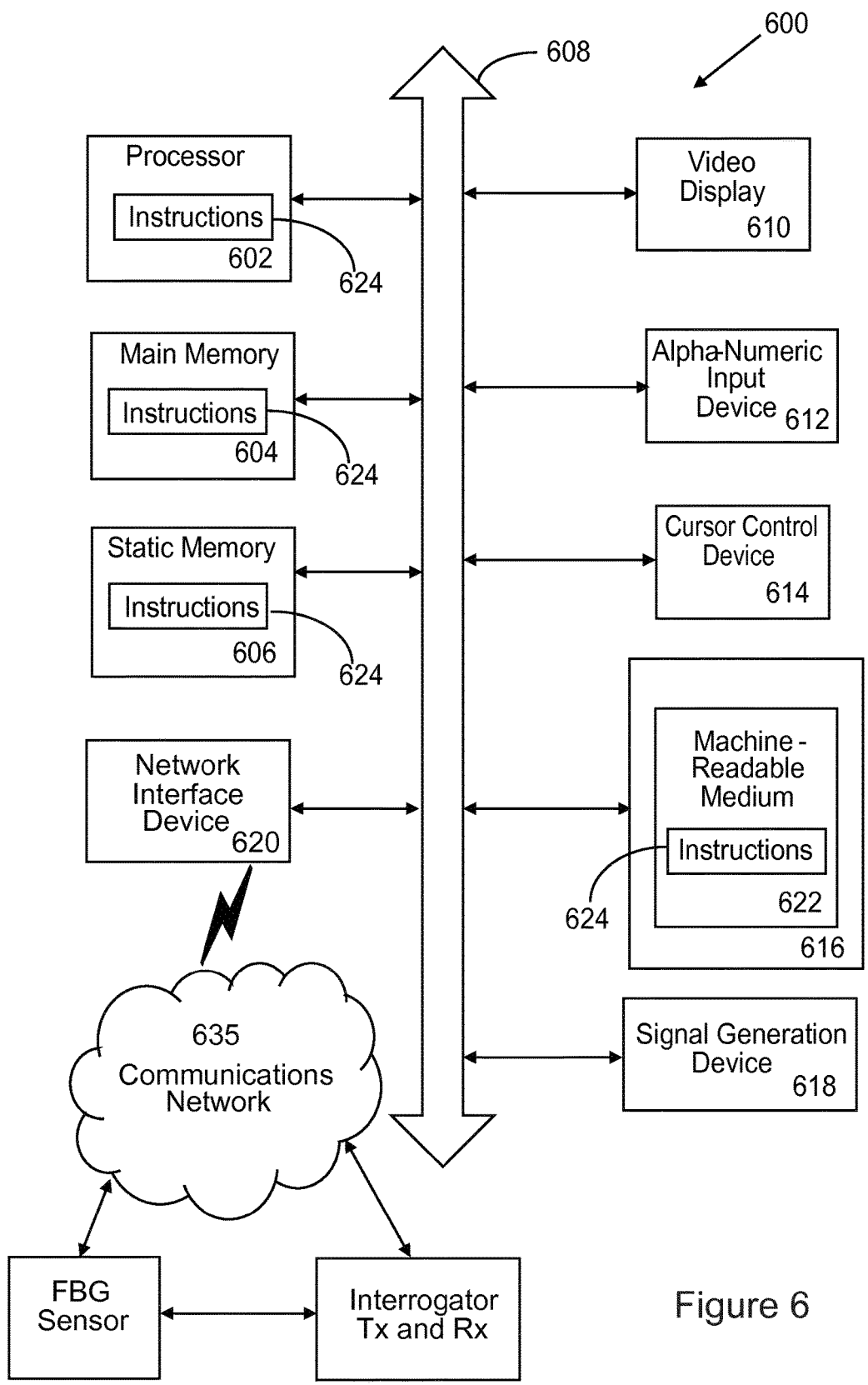
FIG. 6 is a schematic diagram of a machine in the form of a computer system within which a set of instructions, when executed, may cause the machine to perform any one or more of the methodologies or operations of the systems and methods for tracking the centre of a peak from a plurality of sample points.

Additionally, referring now also to FIG. 6, at least a portion of the systems, methodologies and techniques described with respect to the exemplary embodiments of present disclosure can incorporate a machine, such as, but not limited to, computer system 600, or any other computing device within which a set of instructions, when executed, may cause the machine to perform any one or more of the methodologies or functions discussed above. The machine may be configured to facilitate various operations conducted by the systems disclosed herein. For example, the machine may be configured to, but is not limited to, assist the systems by providing processing power to assist with processing loads experienced in the systems, by providing storage capacity for storing instructions or data traversing the systems, or by assisting with any other operations conducted by or within the systems.

In some embodiments, the machine operates as a standalone device. In some embodiments, the machine may be connected (e.g., communications network 635) to and assist with operations performed by other machines, such as, but not limited to, the FBG sensors and an optical interrogator system. The machine may be connected with any component in the systems. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 604, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions 624 (e.g., software) embodying any one or more of the methodologies or functions described herein, including those methods illustrated above. The instructions 624 may also reside, completely or at least partially, within the main memory 604, the static memory 606, or within the processor 602, or a combination thereof, during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium 622 containing instructions 624 so that a device connected to the communications network 635, other network, or both, can send or receive voice, video or data, and to communicate over the communications network 635, other network, or both, using the instructions. The instructions 624 may further be transmitted or received over the communications network 635, other network, or both, via the network interface device 620.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The terms "machine-readable medium" or "machine-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium" or "machine-readable device" may be non-transitory in nature. Accordingly, the disclosure is considered to include any one or more of a machine-readable medium or a distribution medium, as listed herein and including art-recognized equivalents and successor media, in which the software implementations herein are stored.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The application is not limited to the embodiments hereinbefore described but may be varied in both construction and detail.

The invention claimed is:

1. A method to determine the center of a peak of data points obtained from a plurality of optical sensors configured to sense one or more physical entities and connected by one or more optical fibers to an optical interrogator system, the optical interrogator system comprising a processor, the one or more optical sensors, and a non-transitory computer readable medium configured to store instructions which when executed by the processor causes the processor to execute the method, the method comprising:

receiving spectral sample points from the plurality of optical sensors, wherein at least one of the plurality of optical sensors has a narrower spectral width than another of the plurality of optical sensors and wherein at least a portion of the spectral sample points are at a high frequency;

performing an initial setup measurement of the spectral sample points for determining an initial frequency and for extracting a peak;

fitting the peak with a fitting function that uses the initial frequency and at least one of the peak's width, amplitude, the center offset as fitting parameters, or a combination thereof;

producing a set of linear equations which when solved calculate the optimum fit of a function to the peak assuming the previously calculated peak's width;

performing subsequent measurements, via at least one of the plurality of optical sensors configured to sense the one or more physical entities, of the data points to find peaks; and solving the set of linear equations to determine the center of the measured peaks, wherein the center of the measured peaks correspond to the one or more physical entities sensed by the one or more connected optical sensors.

2. The method of claim 1 wherein the fitting function comprises a sinusoidal function.

3. The method of claim 1 wherein performing subsequent measurements of the data points to find peaks comprises interrogating an optical sensor of the plurality of optical sensors.

4. The method of claim 1 wherein performing subsequent measurements of the data points to find peaks comprises interrogating a FBG, etalon, Gas Cell, Fabry Perot Interferometer, a Mach Zehnder Interferometer, or a combination thereof.

5. The method of claim 1 wherein the center of the measured peak moves within the measurement window and the width of the peak remains constant.

6. The method of claim 1 wherein the fitting function is linear with respect to three fitting parameters such that its sum of squares minimization can be performed by solving a set of linear simultaneous equations.

7. The method of claim 1 wherein the fitting function comprises a Fourier Fit.

8. The method of claim 1 wherein the fitting function is configured to support weighting each fit point.

9. The method of claim 1 wherein the fit points are configured to be processed in hardware.

10. A system to determine the center of a peak of data points, the system comprising:
   a plurality of optical sensors configured to sense one or more physical entities and connected by one or more optical fibers to the system;
   a memory that stores instructions;
   a processor that executes the instructions to perform operations, the operations comprising:
   receiving spectral sample points from the plurality of optical sensors, wherein at least one of the plurality of optical sensors has a narrower spectral width than another of the plurality of optical sensors and wherein at least a portion of the spectral sample points are at a high frequency;
   performing an initial setup measurement of the sample points for determining an initial frequency and extracting a peak;
   fitting the peak with a fitting function that uses the initial frequency and at least one of the peak's width, amplitude, center offset, or a combination thereof as fitting parameters;
   producing a set of linear equations which when solved calculate the optimum fit of a function to the peak assuming the previously calculated peak's width; and
   performing subsequent measurements, via at least one of the plurality of optical sensors configured to sense the one or more physical entities, of the data points to find peaks and solving the set of linear equations to determine the center of the peaks, wherein the center of the measured peaks correspond to the one or more physical entities sensed by the one or more connected optical sensors.

11. The system of claim 10 wherein the fitting function comprises a sinusoidal function.

12. The system of claim 10, wherein performing subsequent measurements of the data points to find peaks comprises interrogating an optical sensor of the plurality of optical sensors.

13. The system of claim 10, wherein performing subsequent measurements of the data points to find peaks comprises interrogating a FBG, etalon, Gas Cell, Fabry Perot Interferometer, a Mach Zehnder Interferometer, or a combination thereof.

14. The system of claim 10, wherein the center of the measured peak moves within the measurement window and the width of the peak remains constant.

15. The system of claim 10, wherein the fitting function is linear with respect to three fitting parameters such that its sum of squares minimization can be performed by solving a set of linear simultaneous equations.

16. The system of claim 10, wherein the fitting function comprises a Fourier Fit.

17. The system of claim 10, wherein the fitting function is configured to support weighting each fit point.

18. The system of claim 10, wherein the fit points are configured to be processed in hardware.

19. A non-transitory computer-readable device comprising instructions, which when loaded and executed by a processor, cause the processor to perform operations comprising:
   receiving spectral sample points from a plurality of optical sensors, wherein at least one of the plurality of optical sensors has a narrower spectral width than another of the plurality of optical sensors and wherein at least a portion of the spectral sample points are at a high frequency;
   performing an initial setup measurement of the spectral sample points for determining an initial frequency and extracting a peak;
   fitting the peak with a function that uses the initial frequency and at least one of the peak's width, amplitude, center offset, or a combination thereof as fitting parameters;
   producing a set of linear equations which when solved calculate the optimum fit of a function to the peak assuming the previously calculated peak's width; and
   performing subsequent measurements, via at least one of the plurality of optical sensors configured to sense the one or more physical entities, of the data points to find peaks and solving the set of linear equations to determine the center of the peaks, wherein the center of the peaks correspond to the one or more physical entities sensed by the one or more connected optical sensors.

20. The non-transitory computer-readable device of claim 19, wherein the fitting function comprises a sinusoidal function.

21. The non-transitory computer-readable device of claim 19, wherein performing subsequent measurements of the data points to find peaks comprises interrogating an optical sensor of the plurality of optical sensors.

22. The non-transitory computer-readable device of claim 19, wherein performing subsequent measurements of the data points to find peaks comprises interrogating a FBG, etalon, Gas Cell, Fabry Perot Interferometer, a Mach Zehnder Interferometer, or a combination thereof.

23. The non-transitory computer-readable device of claim 19, wherein the center of the measured peak moves within the measurement window and the width of the peak remains constant.

24. The non-transitory computer-readable device of claim 19, wherein the fitting function is linear with respect to three fitting parameters such that its sum of squares minimization can be performed by solving a set of linear simultaneous equations.

25. The non-transitory computer-readable device of claim 19, wherein the fitting function comprises a Fourier Fit.

26. The non-transitory computer-readable device of claim 19, wherein the fitting function is configured to support weighting each fit point.

27. The non-transitory computer-readable device of claim 19, wherein the fit points are configured to be processed in hardware.

* * * * *